No. 882,775. PATENTED MAR. 24, 1908.
L. ARMS.
COMBINED SCRAPER AND CONVEYER.
APPLICATION FILED AUG. 2, 1907.

2 SHEETS—SHEET 1.

Witnesses
Phil E. Barnes
R. C. Braddock

Inventor
Lorenz Arms,
By Chamberlin & Lane
Attorneys

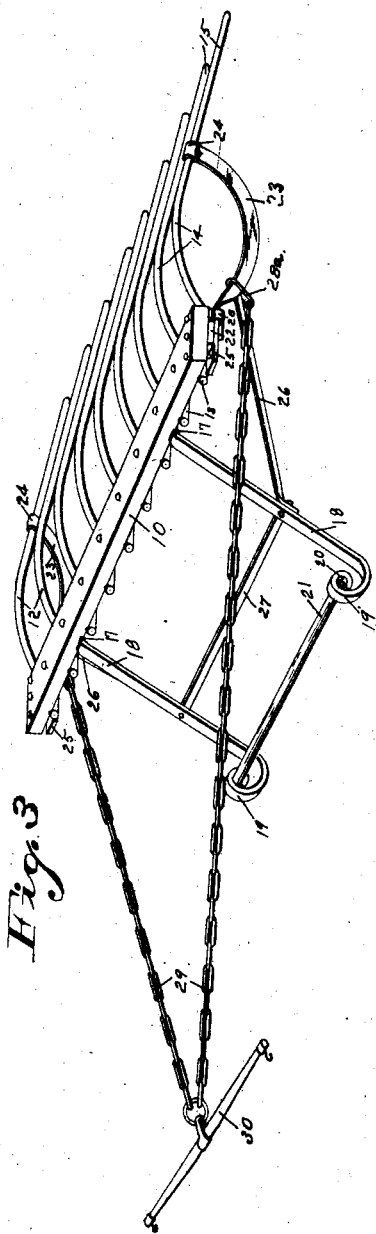

UNITED STATES PATENT OFFICE.

LORENZ ARMS, OF WIMBLEDON, NORTH DAKOTA.

COMBINED SCRAPER AND CONVEYER.

No. 882,775.    Specification of Letters Patent.    Patented March 24, 1908.

Application filed August 2, 1907.  Serial No. 386,724.

*To all whom it may concern:*

Be it known that I, LORENZ ARMS, a citizen of the United States, residing at Wimbledon, in the county of Barnes and State of North Dakota, have invented a certain new and useful Combined Scraper and Conveyer, of which the following is a specification.

The present invention consists of certain new and useful improvements in combined scrapers and conveyers.

The principal object of the invention is to provide an agricultural implement which in itself is capable of performing the work usually performed by two implements, and with this object in view the invention comprises an implement which, while in one position is capable of being used for conveying and scattering manure or the like, when reversed, may be easily drawn from one point to another.

Another object of the invention is to provide a novel form of draft connection, said draft connection being so arranged as to accommodate itself to either position the implement may be working in.

Another object of the invention is to provide a novel form of handle through which the implement is controlled in its movements when used for transporting and scattering the material, and which, when the implement is reversed, form means for the easy transportation of the implement.

Another object is in the manner of assembling the parts, whereby with the use of few parts, a strong and serviceable structure is produced, in which each of said parts contribute to the support of other parts.

Other and further objects of the invention will be apparent from the following detailed description, pointed out in the claims, and illustrated in the accompanying drawings.

Figure 1:
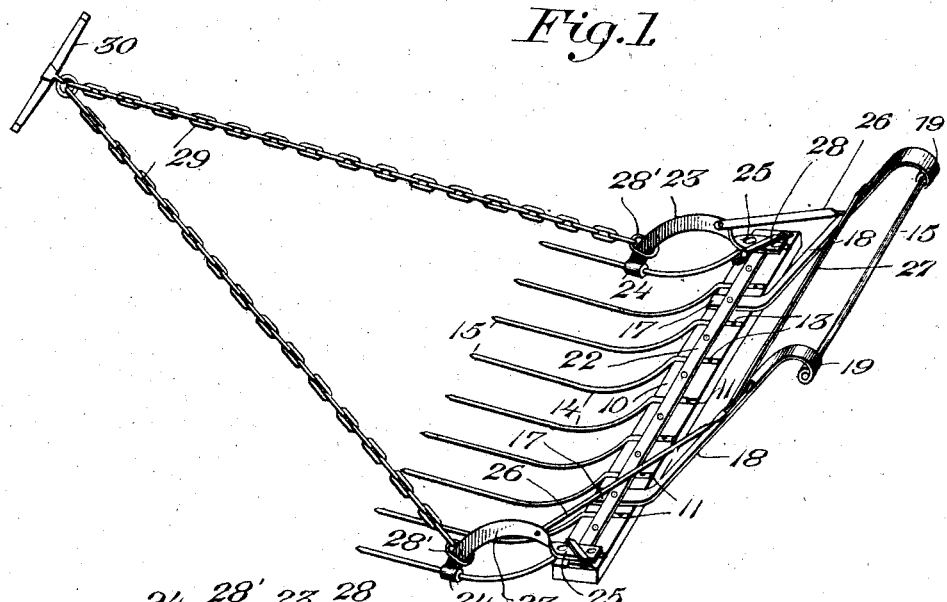
Figure 2:
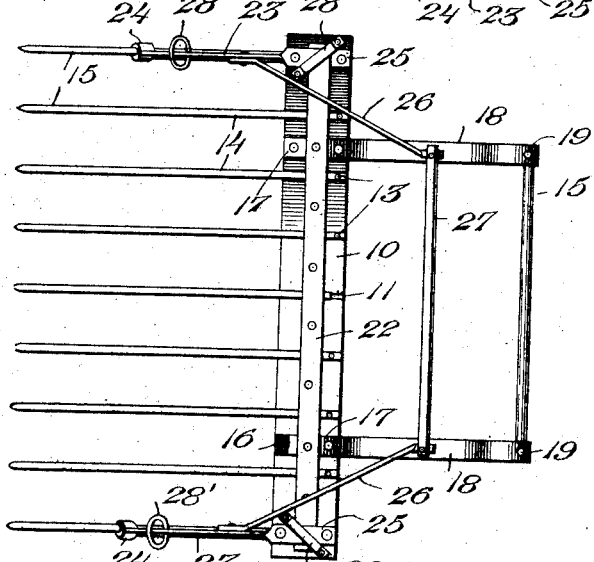
Figure 4:
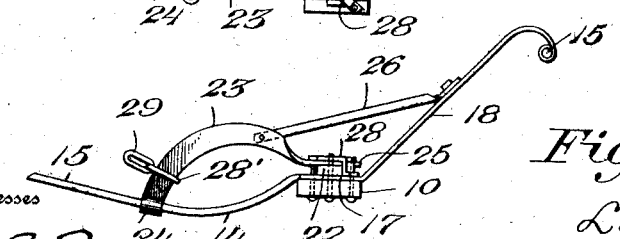

In said drawings in which like characters of reference refer to corresponding parts,—Figure 1 is a perspective view of the implement, the same being used for transporting or scattering purposes. Fig. 2 is a plan view. Fig. 3 is a perspective view, the implement being reversed and used as a scraper or rake. Fig. 4 is a side elevation.

Referring to the accompanying drawings, 10 designates a beam which is of wood and of a length as may be necessary or desirable and of sufficient thickness to afford great strength and yet not be of such a weight as to cause the implement to sink into the surface over which it is being moved. At suitable intervals throughout its length the said beam is provided with transverse shallow slots 11 which extend across its upper surface.

Referring more particularly to Fig. 1 of the drawings, it will be observed that the beam 10 has a plurality of tines 12 prejecting therefrom. Said tines have a straight end portion 13 which is fitted within the slots 11 of the beam 10. From said straight end portions, the tines curve downwardly and outwardly, as at 14, and terminate in the straight portions 15. At a point intermediate of each of its ends, the beam 10 is provided with a wide transverse slot 16, for the reception of the ends 17 of the handle supports 18. Said handle supports 18 are arranged at an upward inclination, their outer portions terminating in a rounded portion 19, the ends of which are turned in on themselves to form an eye 20 for the reception of a handle bar 21, preferably of wood. A narrow metallic retaining strap 22 of the same length as the beam 10, is extended along the upper surface of said beam, over the tine ends 13 and handle support ends, and is bolted down tight onto said beam and serves to retain the said tine ends and the ends of the handle supports firmly in position. A draft connection is provided at each end of the beam 10, said draft connection comprising a bar 23, curved outwardly, one of its ends being provided with an eye 24, which is placed over the tine at each end of the beam 10, its other end being flattened out to form a strap 25. Said strap 25 is attached to the beam 10 by means of bolts or the like and extends over the strap 22. At a point on said bar 23 and adjacent to its flattened portion a brace rod 26 is secured, the other end of said brace rod being secured to the handle supports 18 at approximately their centers. At the point where the handle supports and brace rods connect, a horizontal brace 27 is arranged. Said horizontal brace connects the two supports 18, and preferably the point at which the connection is had is the same point at which the brace rod 26 connects, so that the three parts may be securely attached by means of one bolt. To afford a strengthening means for the connection of the flattened ends 25 of the bar 23 with the beam 10, a short strap 28 is bolted over it and to the beam. On each of said bars 23 a ring $28^1$ is slidably mounted, and from which extends the draft chain 29, or the like, the outer ends of which are connected with a swingle tree 30.

In using the implement as a transporting or scattering medium, it is brought up to a previously formed pile, and by an upward pressure of the handle bar the curved portions of the tines are lowered until their outer ends are in line with the bottom of the pile. The tines are then forced under said pile, the material being shifted back on the tines by means of a rocking movement imparted through the handle bar and curved portion of the tines. When the desired load has been received, a downward pressure on the handle bar causes the ends of the tines to be raised, and the implement may be moved to the point where the material is to be dumped. Or in cases where the material is to be spread over an extended surface, the implement may be rocked continuously by pressing down on the handle bar, causing said material to be gradually dropped. From the foregoing it will be understood that the curved portions of the tines, in addition to being used for rockers, also serves the important function of runners, which makes the transportation of the implement easy. After the material has been scattered, or dumped, the implement is raised up and turned completely over, as shown in Fig. 3 of the drawings, until it rests on the curved portions of the handle supports and the ends of the tines, in which position it may be easily drawn from one point in a field or other place to another point. During the reversing of the implement, the draft rings will slide on the bars 23, to the opposite ends thereof, thereby automatically shifting the point at which the pull is exerted.

From the foregoing description and operation, it will be seen that by means of the described form and arrangement of the tines and handle supports, an efficient implement is provided in which provision is made for providing runners for the implement in either of its positions, and also provision for shifting and scattering the material that is being transported. And it will be further observed that by means of the form of draft connection used, an automatic shift of the point of pull is had on the reversal of the machine, which obviates the danger of the implement being casually or accidentally overturned, such as would be the case were the draft connection not shifted. And it will be further observed that by means of the form and arrangement of each connection and brace, the attached parts overlap one another and are separately secured, thereby imparting great strength and rigidity to the implement.

I claim as my invention:—

1. An agricultural implement for the purpose described, comprising tines, a handle fixed with respect to the tines and provided with portions arranged to form runners when the implement is inverted, and a draft connection arranged in one position of the implement to extend forward from points above the tines and in the other position of the implement to extend forward from points below the tines.

2. An agricultural implement comprising a beam, a plurality of tines carried thereby, a handle, and common means for retaining the tines and handle in engagement with said beam.

3. An agricultural implement comprising a beam, a plurality of tines carried thereby, a handle, common means for retaining the tines and handle in engagement with said beam, and a draft connection.

4. An agricultural implement comprising a beam, a plurality of tines carried thereby, and a strap for securing both the tines and handle to said beam.

5. An agricultural implement comprising a beam, a plurality of tines projecting from one portion thereof, a handle projecting from its other portion, said tines being provided with means upon which the implement may be rocked and also forming runners, and said handle being provided with a portion which forms runners when the implement is reversed, and a draft connection carried by said implement, said draft connection being provided with means whereby it automatically adjusts itself to the implement when said implement is used in either of its positions.

6. A combined conveying and scraping implement consisting of a beam having a plurality of downwardly and outwardly curved tines projecting therefrom, an upwardly inclined handle carried by said beam, said handle being provided with a portion which is curved in a direction opposite to the curvature of the tines, means for retaining the handle and tines in engagement with the beam, and an automatic shiftable draft connection carried by said implement.

7. A reversible agricultural implement provided with downwardly and outwardly curved tines, an upwardly inclined handle provided with a portion which is curved in a direction opposite to the curvature of the tines, whereby when the implement is used for conveying purposes the curved portion of the tines form means upon which the implement may be rocked and also form runners, and when the implement is reversed the curved portion of the handle forms supporting runners, and a draft connection carried by said implement, said draft connection being provided with means whereby it may accommodate itself to the different positions in which the implement is being used.

8. An agricultural implement comprising a beam, a plurality of tines carried thereby, a handle, means for retaining the said tines and said handle in engagement with the said beam, a curved bar at each end of the beam, said bar having one end in engagement with each outer tine, and a draft chain slidably connected with said bars.

9. An agricultural implement comprising a beam, a plurality of tines carried thereby, a handle carried by said beam, means for retaining the said tines and said handle in engagement with said beam, a curved bar at each end of the said beam, said curved bars being provided with a flattened portion which engages with the said beam and at its other end with means for slidably engaging with the end tines, a ring slidably mounted on each bar, and a draft cable connected with said rings.

10. An agricultural implement comprising a beam, a plurality of downwardly and outwardly curved tines carried thereby, a handle carried by said beam, said handle being provided with a portion curved in a direction opposite to the curvature of the tines, a curved bar at each end of the beam, said bars being provided with a flattened portion which engages with the beam, their outer ends being provided with an eye for engagement with the end members of the plurality of tines, a ring slidably mounted on said bars, and a draft chain connected to each ring.

LORENZ ARMS.

Witnesses:
JOHN J. DECKLER,
W. M. OSBORN.